UNITED STATES PATENT OFFICE.

WILLIAM FELDENHEIMER, OF LONDON, ENGLAND.

TREATMENT OF CLAY.

1,324,958.   Specification of Letters Patent.   Patented Dec. 16, 1919.

No Drawing.   Application filed November 27, 1918. Serial No. 264,441.

*To all whom it may concern:*

Be it known that I, WILLIAM FELDENHEIMER, a subject of the King of England, residing in London, England, have invented certain new and useful Improvements in the Treatment of Clay, of which the following is a specification.

This invention relates to clay and the treatment thereof whereby it is cleared from impurities and the materials constituting the untreated mixture are separated from one another. The object of the present invention is to effect a further separation of such materials than has heretofore been carried out.

In British Patent No. 106,890 dated July 10th, 1916, "improvements in or relating to the treatment of china clay", and granted to me, I have disclosed a method of cleaning clay from impurities which consists in (*a*) adding a deflocculating reagent (for example sodium carbonate) to an aqueous suspension of the mixed material to cause sedimentation of impurities, (*b*) floating the supernatant suspension away from above the thus sedimented impurities to a second tank, and (*c*) adding a clay-depositing reagent, for example a weak solution of commercial alum in sufficient quantity to neutralize the alkalinity of the solution and to deposit the clay.

It has now been discovered that the flocculation in the second tank may be carried out in such a manner by a modification of the above process, that a further separation of materials contained in suspension than is ordinarily effected by the deflocculator alone, can be obtained, say by using sodium carbonate as the deflocculator and aluminium sulfate as the flocculator; obviously all the impurities could be settled out by the deflocculator but this would necessitate the continuance of the settling process for so long that clay would settle out with it.

According to the present invention, the clay is cleaned according to the process described above, characterized by the modification that the flocculating reagent is added slowly enough, or in such total quantity relatively to the quantity of the deflocculator, as to cause flocculation or coagulation of the clay, but not rapid sedimentation, whereupon separation from the clay in suspension of material other than that ordinarily separated therefrom by the deflocculator alone will take place.

It is found that the deposition of the materials is in two layers whereof the upper is clay and the lower is foreign matter constituting the said additional material or residuum and this is sometimes valuable.

In carrying out the process, care should be taken that the supernatant suspension remains in the second tank long enough to allow of the desired separation and this may be as much as four days or say, as many days as the hours required for the step (*a*) in depositing impurities by the deflocculator alone.

According to one method of carrying out this invention as applied to Fraddon clay, after the clay suspension has been treated in the ordinary way by running over mica drags, a deflocculator is added and the treatment described in my prior British patent specification No. 106890 is followed as applied to, say, a 5% suspension except that the deflocculator is only added while the suspension is running into the tank and not during the running of the solution over the mica drags. The supernatant suspension is allowed to remain in the settling tank not more than 4 hours, as stated in the said specification, the period, in any case, being such that deposition of clay does not take place. It is then run off into a second tank which is the flocculating or sedimentation tank, and as it runs into this second tank a flocculator, for example a solution of aluminium sulfate, is run in with it. The important feature in the process is the running of this solution in with the suspension sufficiently slowly and only in sufficient final quantity as to produce flocculation or coagulation of the clay without rapid sedimentation of the same. The strength of the solution used may be strong or otherwise, but if a strong solution is employed it must be run in more slowly than if a weak solution is used. It has been found that if, in a 5% clay suspension, 1.5% sodium carbonate relatively to the clay has been employed, about 1.5% relatively to the clay of aluminium sulfate will be required to effect the slow sedimentation but the exact amount can always be accurately gaged by watching the process and stopping the running in of the flocculator directly flocculation or sedimentation commences. Particular attention is directed to the fact that the total quantity of flocculator must be introduced slowly into the suspension to produce the best results.

It will be appreciated from the above that what has to be really gaged is that the percentage of flocculator employed relatively to the percentage of the deflocculator previously employed has to be only such as to just start flocculation. This quantity is most easily obtained by the manner already given but if, for any reason, it is desired to put the whole quantity of the flocculator quickly into the tank, the separation of the further impurities referred to will take place partially in proportion as the sedimentation is hastened or otherwise, but they will not be so completely separated from the clay as is the case when the flocculator is added slowly.

By this process the length of time in which the clay suspension is left in the deflocculating tank can be decreased as such impurities which would be further settled out will be removed in the second tank, whereas keeping the clay too long in the first tank, although a certain amount of further settling out of impurities takes place, results, as already stated, in loss of clay which begins to settle with the finer impurities.

After a batch has been thus treated with aluminium sulfate a second batch may be run in and treated, without first having removed the residuum deposited from the first batch, and this may be repeated as often as desired. It is found that with the treatment of such successional batches the residuum from each batch percolates through any clay that may have been allowed to remain from the previous batch and amalgamates itself with the residuum of such previous batch or batches beneath the clay that may have been left. If desired, the clay, after each batch has been treated, can be run off from above the residuum into a separate tank.

It may happen that the clay in the aluminium sulfate tank acquires the condition of a stiff paste, which may occur as a result of excessive concentration and of loss of water, and the paste may be so stiff that when a further batch is run in, the residuum from it cannot percolate satisfactorily through the clay paste. In such case the clay must be thinned; one simple method of effecting this is to run the said further batch into the aluminium sulfate tank as a suspension to which only deflocculating reagent has been added, allowing it to rest for a short period of time, and adding the flocculating reagent to this batch afterward. The presence of the deflocculator e. g. sodium carbonate, in the clay-water system lowers the viscosity and facilitates percolation. The clay, if in a thick layer, may be agitated, e. g. by raking, to equalize the viscosity throughout the mass, and insure percolation.

It usually happens that the residuum thickens to a paste immediately upon being deposited at the bottom of the tank, whereas on the contrary the clay becomes pasty and more slowly and to degree which depends upon and increases with the time allowed for it to settle.

It is to be observed that the process does not appear to be applicable with equal success to all clays indiscriminately, but the degree of success appears to depend in some measure upon the character of the impurities mixed with the clay. In china clays such impurities generally comprise on the one hand fine sand and quartz, and on the other hand true micas, such for example as muscovite, sericite, biotite, and I have found that where the former character of impurity, that is to say, fine sands and quartz, preponderates, the process of this invention does operate so satisfactorily. In the case of Fraddon clay, the residuum appears to consist principally of sericitic micas. It is always desirable to remove the coarser impurities by washing and passing over mica drags in manner usually adopted with china clays, before applying to a clay the process of this invention.

As examples of clays other than Fraddon clay, which can be treated satisfactorily by the process of this invention, there may be mentioned Pentruff china clay and a large number of mid-Cornwall china clays; also some of the North American china clays, notably some of those from North Carolina.

Care must be taken in dealing with the clay from any particular source, to operate upon it with such deflocculators and flocculators as are suited to it with regard to the character of impurity contained by it and other considerations such as its ability to be deflocculated, the chemical content of the clay itself, and its physical nature. Thus, for example, with Fraddon clay, employing a 5% suspension, tannic acid may be used as a deflocculator in strengths varying from 4%-10% of the acid to the clay contained in the suspension, and as a flocculator to follow the tannic acid, sulfuric acid may be employed in varying proportions with relation to the amount of tannic acid employed, viz., from about 10% of sulfuric acid to tannic acid when the latter was employed in the proportion of 10% of the clay up to something in the neighborhood of 100% of sulfuric acid to tannic acid when the latter was in weaker strength, say about 4% of the clay.

On the other hand, when gum-arabic was tried on a 5% suspension of Fraddon clay sulfuric acid could not be employed as flocculator in a commercial manner, unless the concentration of gum was as low as about 1% relatively to the clay. With 10% of gum to clay, 1400% of sulfuric acid to gum did not affect flocculation. Further, although sodium chlorid and sodium carbonate will flocculate well after tannic acid, the amounts of these required to flocculate after gum-arabic are so relatively large as to be commercially inadvisable.

In general, organic deflocculators do not result in such complete separation of impurities as do the inorganic, but they nevertheless generally deflocculate clays which inorganic substances fail to suspend.

What I claim as my invention and desire to secure by Letters Patent is:—

1. A process for cleaning clay by suspension and sedimentation which consists in adding a deflocculating reagent to an aqueous suspension of the clay to cause sedimentation of only part of the impurities in the clay, decanting the supernatant suspension away from the sedimented impurities thus obtained, and adding to the decanted suspension a total quantity of a flocculating reagent only sufficient to produce flocculation or coagulation of the clay but without rapid sedimentation of the same and permitting the solution to settle, whereby certain ingredients not ordinarily separable from the clay are deposited in a layer under a layer of sedimented clay, for the purpose specified.

2. A process for cleaning a clay by suspension and sedimentation which consists in adding a deflocculating reagent to an aqueous suspension of the clay to cause sedimentation of only part of the impurities in the clay, decanting the supernatant suspension away from the sedimented impurities thus obtained, adding to the decanted suspension a flocculating reagent so slowly that flocculation of the clay is produced without rapid sedimentation of the same, and only continuing this addition until flocculation of the clay commences and permitting the solution to settle, whereby certain ingredients not ordinarily separable from the clay are deposited in a layer under a layer of sedimented clay, for the purpose specified.

3. A process for cleaning clay which consists in adding 1.5 parts by weight of actual sodium carbonate to a 5 per cent. suspension by weight of Fraddon clay in 2,000 parts by weight of water to cause sedimentation of only part of the impurities in the clay, decanting the supernatant suspension away from the sedimented impurities thus obtained, and slowly adding to the decanted suspension approximately 1.5 parts by weight of aluminium sulfate and permitting the solution to settle, whereby certain ingredients not ordinarily separable from the clay are deposited in a layer under a layer of sedimented clay, for the purpose specified.

In testimony whereof I have signed my name to this specification in the presence of two subscribing witnesses.

WILLIAM FELDENHEIMER.

Witnesses:
HARRY K. MIDGE,
F. MOORE.